United States Patent [19]
Doherty et al.

[11] Patent Number: 5,592,188
[45] Date of Patent: Jan. 7, 1997

[54] METHOD AND SYSTEM FOR ACCENTUATING INTENSE WHITE DISPLAY AREAS IN SEQUENTIAL DMD VIDEO SYSTEMS

[75] Inventors: Donald B. Doherty, Richardson, Tex.; Robert J. Gove, Los Gatos, Calif.

[73] Assignee: Texas Instruments Incorporated, Dallas, Tex.

[21] Appl. No.: 368,448

[22] Filed: Jan. 4, 1995

[51] Int. Cl.[6] .................................. H04N 9/12; G02F 1/00
[52] U.S. Cl. ............................. 345/84; 348/771; 348/743
[58] Field of Search .................................. 345/32, 84, 85, 345/108, 147, 148, 150, 151; 348/270, 742, 743, 755, 756, 764, 770, 771; 359/224, 225, 230; H04N 9/12, 9/31

[56] References Cited

U.S. PATENT DOCUMENTS 5,192,946  3/1993  Thompson et al. ..................... 345/150
5,233,385  8/1993  Sampsell ................................. 348/270
5,448,314  9/1995  Heimbuch et al. ..................... 348/270

*Primary Examiner*—Richard Hjerpe
*Assistant Examiner*—Kara Farnandez Stoll
*Attorney, Agent, or Firm*—Robert L. Troike; Richard L. Donaldson

[57] ABSTRACT

A method and system for accentuating intense white display areas in sequential DMD video systems includes generating a special signal for each pixel that indicates whether to boost the intensity of that pixel in all colors. The method further includes enabling the mirrors to be turned on during times of color boundary of the color wheel such that DMD with mirrors receives different mixes of color light that are integrated together to produce intense white. The system may include degamma lookup tables for each color. The degamma lookup tables are augmented when the special signal is generated.

17 Claims, 6 Drawing Sheets

METHOD AND SYSTEM FOR ACCENTUATING INTENSE WHITE DISPLAY AREAS IN SEQUENTIAL DMD VIDEO SYSTEMS

TECHNICAL FIELD OF THE INVENTION

This invention relates to Digital Micromirror Display (DMD) systems and more particularly to accentuating intense white display areas in sequential DMD video systems.

BACKGROUND OF THE INVENTION

A CRT (cathode ray tube) video display has the capacity to overdrive its output intensity over small scene areas that are very bright with respect to the rest of the scene. This trait produces an effect that emphasizes locally bright areas with an intensity higher than that achievable over the entire scene. This effect is desirable in many circumstances.

A new projection display that utilizes reflections from hundreds of thousands of micromirrors, each mounted above its own semiconductor memory cell is described in IEEE Spectrum, Nov. 1993, vol. 30, no. 11, written by Jack M. Younse of Texas Instruments Incorporated. The digital micromirror device (DMD) comprises a special light modulator. The DMD, or digital micromirror, device covers each memory cell of a CMOS STATIC RAM with a movable micromirror. Electrostatic forces based on the data in this cell tilt the mirror plus and minus a few degrees, modulating the light incident on the surface. In one example, the tilt is 10°. The light reflected from any of the mirrors passes through a projection lens and creates an image on a large screen. Light from the remaining off mirrors is reflected away from the projection lens and trapped. The portion of time during which each video frame that the mirror remains in the on state determines the shades of grey from black for 0 on time to white for nearly one hundred percent of the time. One of the ways in which color is added is by a color wheel. This type of system is referred to as a sequential DMD video system. A sequential color DMD display that employs a color wheel uses pulse width modulation (PWM) to depict the intensities for each pixel in each wheel color. Individual mirrors are switched between the off and on state so that each is turned on for a portion of the time where the DMD is uniformly illuminated with a single color. The on time for a minor is proportional to desired intensity in that color. Since all available time in one color is used to depict the full scale intensity, a DMD display cannot "overdrive" pixels in particular colors without reducing the amount of time useable for proportional pulse width modulation.

SUMMARY OF THE INVENTION

In accordance with one preferred embodiment of the present invention, a method and system for accentuating intense light display areas in sequential DMD video systems is provided by generating a special bit for each pixel that indicates whether to boost the intensity of that pixel in all colors. These bits are loaded into the DMD array at the start of all color transition periods to cause individual pixels to be turned on during these times.

DESCRIPTION OF PREFERRED EMBODIMENT OF THE PRESENT INVENTION

Figure 1:
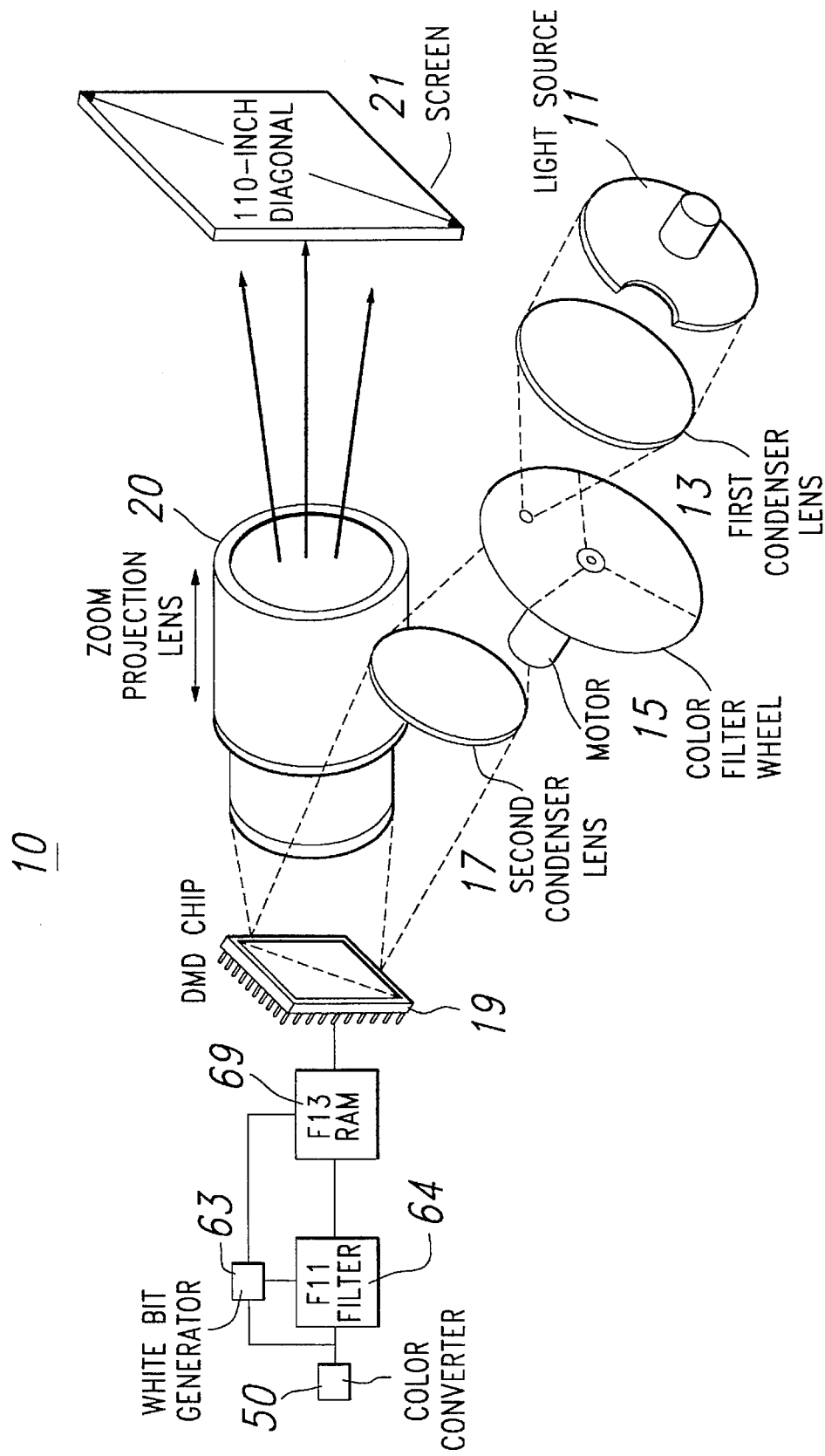
FIG. 1 is an overall system diagram of a sequential color digital micromirror display system.
Figure 2:
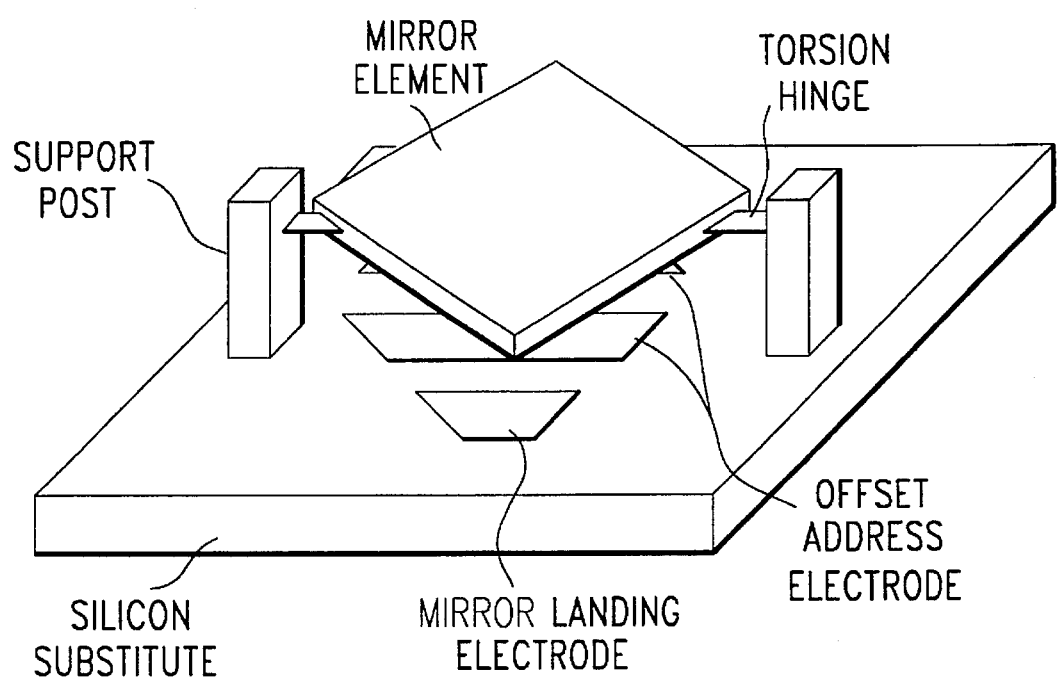
FIG. 2 is a sketch of a micromirror element in FIG. 1.
Figure 3:
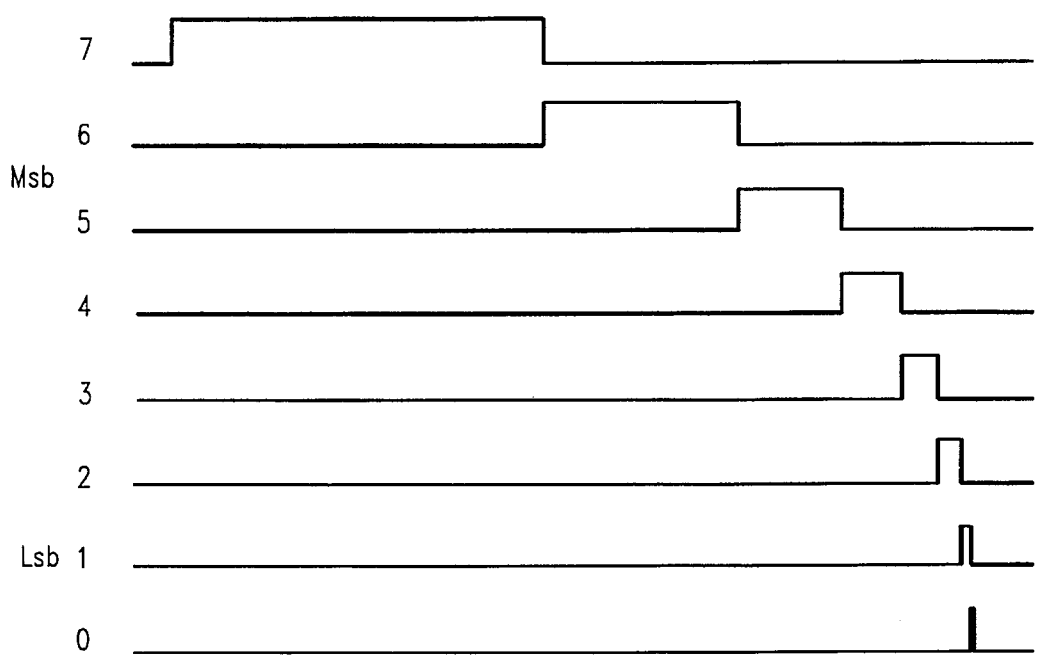
FIG. 3 is a timing diagram illustrating the on time of the MSB and LSB.

Referring to FIG. 1, there is illustrated an overall system diagram of a digital micromirror device (DMD) display system 10 wherein the light from a source 11 is applied through a first condenser lens 13 and through a color wheel 15, which is rotating about 60 cycles, or Hertz, or 60 frames per second. The light passing through the color wheel passes through a second condenser lens onto a DMD chip 19. The DMD chip includes an array of tiny mirrored elements, or micromirrors, where each mirror element is hinged by a torsion hinge and support posts above a memory cell of a CMOS STATIC RAM, as shown in FIG. 2. The movable micromirror tilts into an on or off state by electrostatic forces based on data in the cell. The tilt of the mirror is either plus or minus, for example 10° (off) to modulate the light that is incident on the surface. As shown, the light reflected from any of the mirrors may pass through a projection lens 20 and create images on a large screen 21. As stated previously, the portion of time during which that the mirror remains in the on state determines the shade of gray. The time duration which the cell is in the positive direction, or on, is represented by 8 bits of data sent to that cell. The color wheel 15 is divided into for example red, green, and blue sectors. In the color wheel example for red, green, and blue the maximum red Would be when the red would be reflecting the maximum period of time. That is, the micromirror would be in the on position when the light was passing through essentially the entire time the wheel is in the red sector. The same would be for the other two colors. The minimum would be where the micromirror would be in the off state through the entire period when the color wheel was in the color position. The intensity resolution in this pulse width modulation (PWM) is limited by the response time of the digital DMD mirrors. The total time available to display a color frame and the least time required to turn a mirror to the "on" state and back to the "off" state define the resolution of the present systems. In the arrangement for the 8-bits, the most significant bit is illustrated in FIG. 3 is the seventh bit with that bit representing the longest "on" time, the sixth bit then representing the next longest "on" time, and the fifth bit representing the third longest "on" time, etc. The least significant, or 0 bit, would represent the shortest period of time. For a sequential color DMD system five milliseconds is available for a color frame. For 8-bit binary PWM, the last significant bit (0 bit on only), the shortest period would be on for about 19.6 microseconds. The mirror off/on time would have to be less and 19.6 microseconds to implement this scheme with the current method.

In current designs all micromirrors of DMD device 19 are turned to the "off" state during the time periods when the DMD illumination is changing from one color to another. During these times, a color boundary transverses between the DMD with the micromirrors and light source with the mirrors receiving different mixes of color light depending upon their respective array positions.

In accordance with the present invention, the solution to provide a method for accentuating intense white display areas is to generate a special bit for each pixel that indicates whether to boost the intensity of that pixel in all colors. These bits are then loaded into a DMD array at the start of all color transition periods so that instead of always setting the mirror to the off state during color transmission periods, the individual pixels can be turned on during these times.

In accordance with the present invention, although different pixels receive unequal color phases during any one transition, all transitions integrated together will produce about the same color mix across the array.

Figure 4:
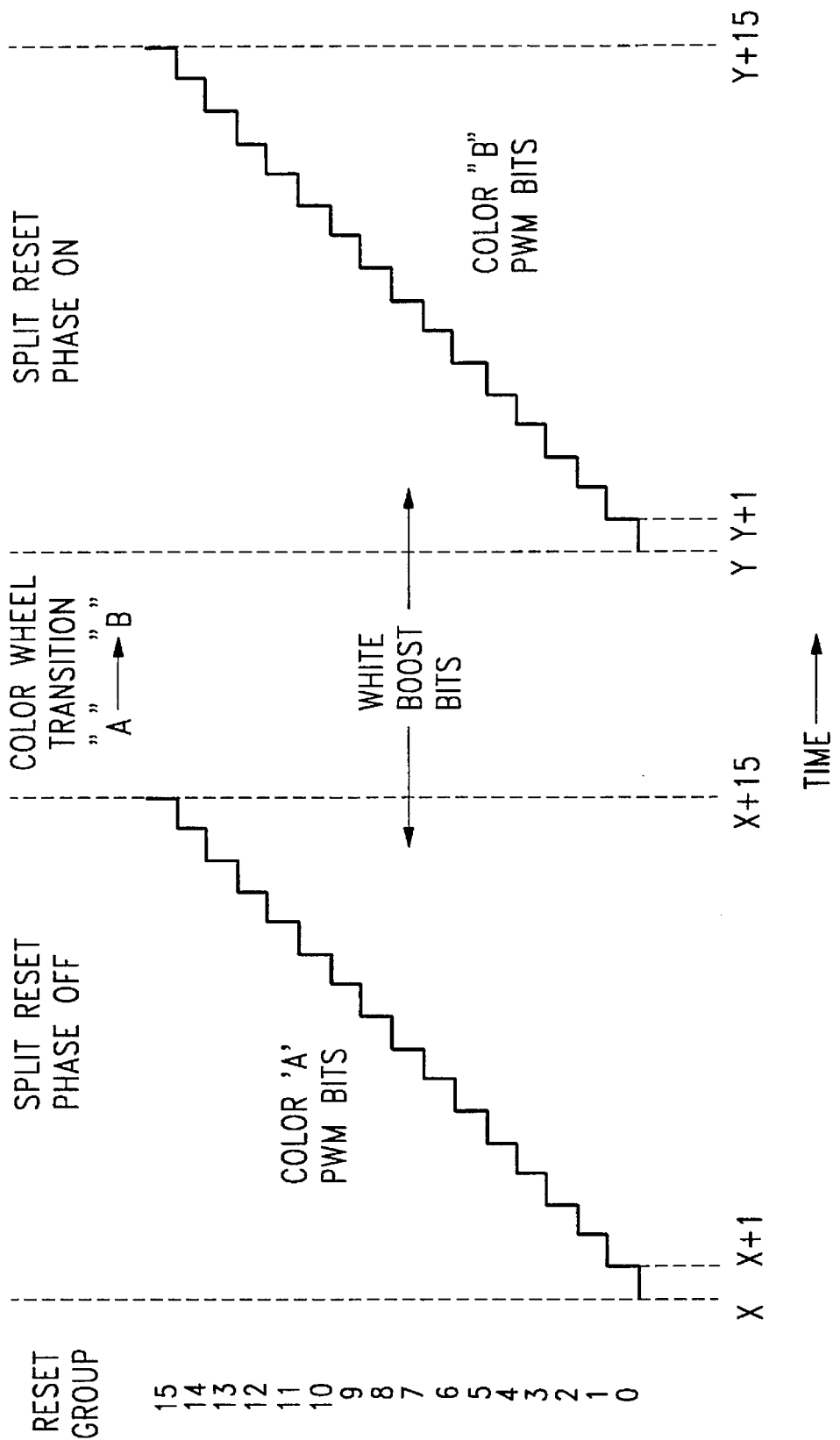
FIG. 4 illustrates the light integration time lost to the phase off and phase on of reset groups before and after wheel transition.

Referring to FIG. 4, there is illustrated the color wheel transition on a split reset DMD. In the example of FIG. 4, there is shown a transition from a color A to a color B. In the time period in the middle, represented between the center dashed lines, there is illustrated a time period of the color wheel transition between a color A and a color B in which the system is normally off. In the vertical axis there is represented 16 reset groups 0–15. In the split reset DMD, the phase "off" to phase "on" is represented by the stepped groups 0–15 with the group 0 being turned "off" at time X and turned "on" at time Y. The groups 1–15 are sequentially phased off from time X+1 through time X+15 with X+15 being the time in which the reset group 15 is turned "off." The time period in which group 0 is turned "on" is again time Y and the reset groups from 1 to 15 are sequentially turned on from time Y+1 up to time Y+15. As represented by FIG. 4, in the split reset mode not only is the color wheel transition period boosted by the system of light boost bits, but also the period of the phase "off" to phase "on" is represented by the figure depending on the group. For example, the period from X to Y for reset group 0 would represent the total period. For group 15 from X+15 to Y+15 would represent the light boost period for the group 15.

Figure 5:
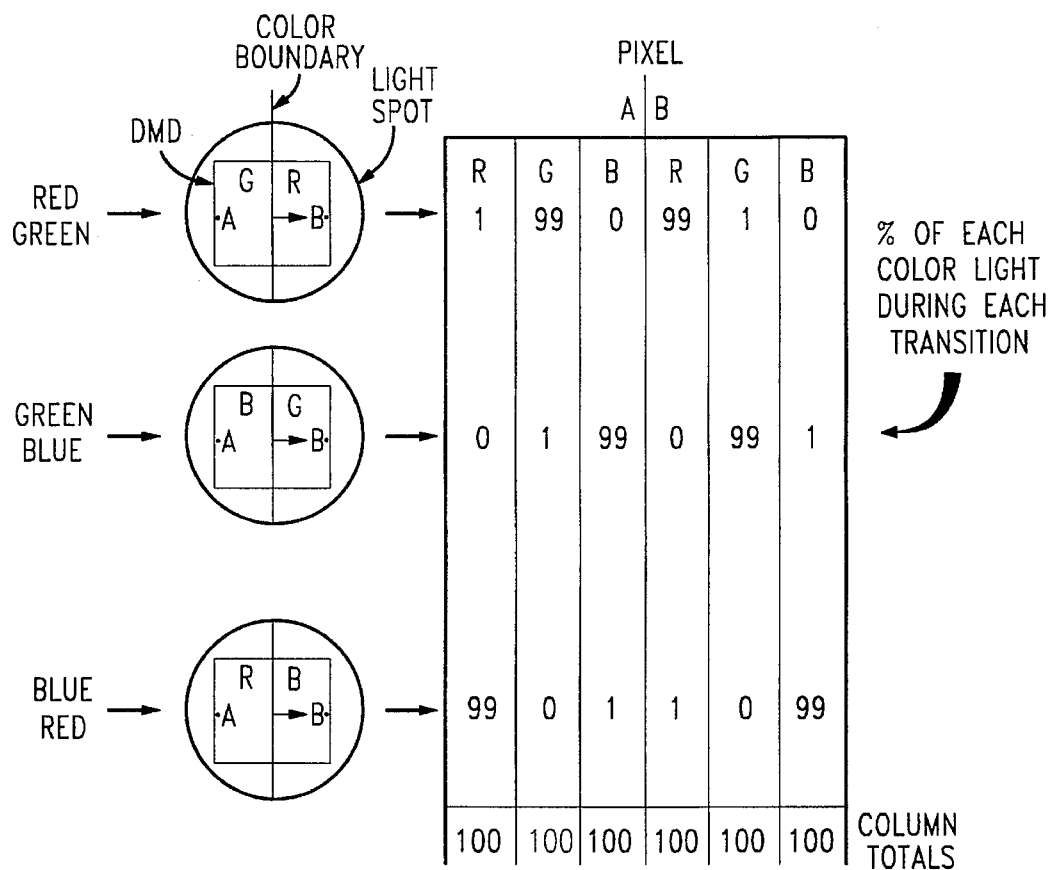
FIG. 5 illustrates the operation of the system where all the colors on the wheel have the same number of segments and the proportion of light from each color is equal.

Referring to FIG. 5, there is illustrated the percentage of each color light during each transmission of a light spot for pixels at points A and B. For pixel at point A on the edge of the DMD as the light crosses the color boundary between the color wheel sectors between red and green the red sector at point A is on for 1 percent of the time and the green is on for 99 percent of the time. At the right hand edge of the DMD for a pixel at point B, the red would exist for 99 percent of the time with there being 1 percent for the green and none to blue. When the color wheel changes from green to blue and the pixels are at points A and B, there would be for pixel at point A 99 percent for blue and only 1 percent for green. For the picture element at point B, pixel B would receive 99 percent of the color in green and i percent in blue. For the transition between blue and with the pixel elements located at points A and B, the pixel element at point A would receive 99 percent in red and I percent blue with no percentage for green. For the pixel at point B for a blue to a red transition, there would be 1 percent red, 0 percent green and 99 percent blue. Over the full cycle of the color wheel each color red, green, and blue for both pixel locations would equally receive 100 percent of the light by integration provide white light.

A simple method is used to detect the regions of the image which must be "peaked" as described as follows. The system detects peaks by comparing red, green, and blue digital signals and sets a boost bit for pixels with equal values of red, green, and blue that over a predetermined threshold.

Figure 6:
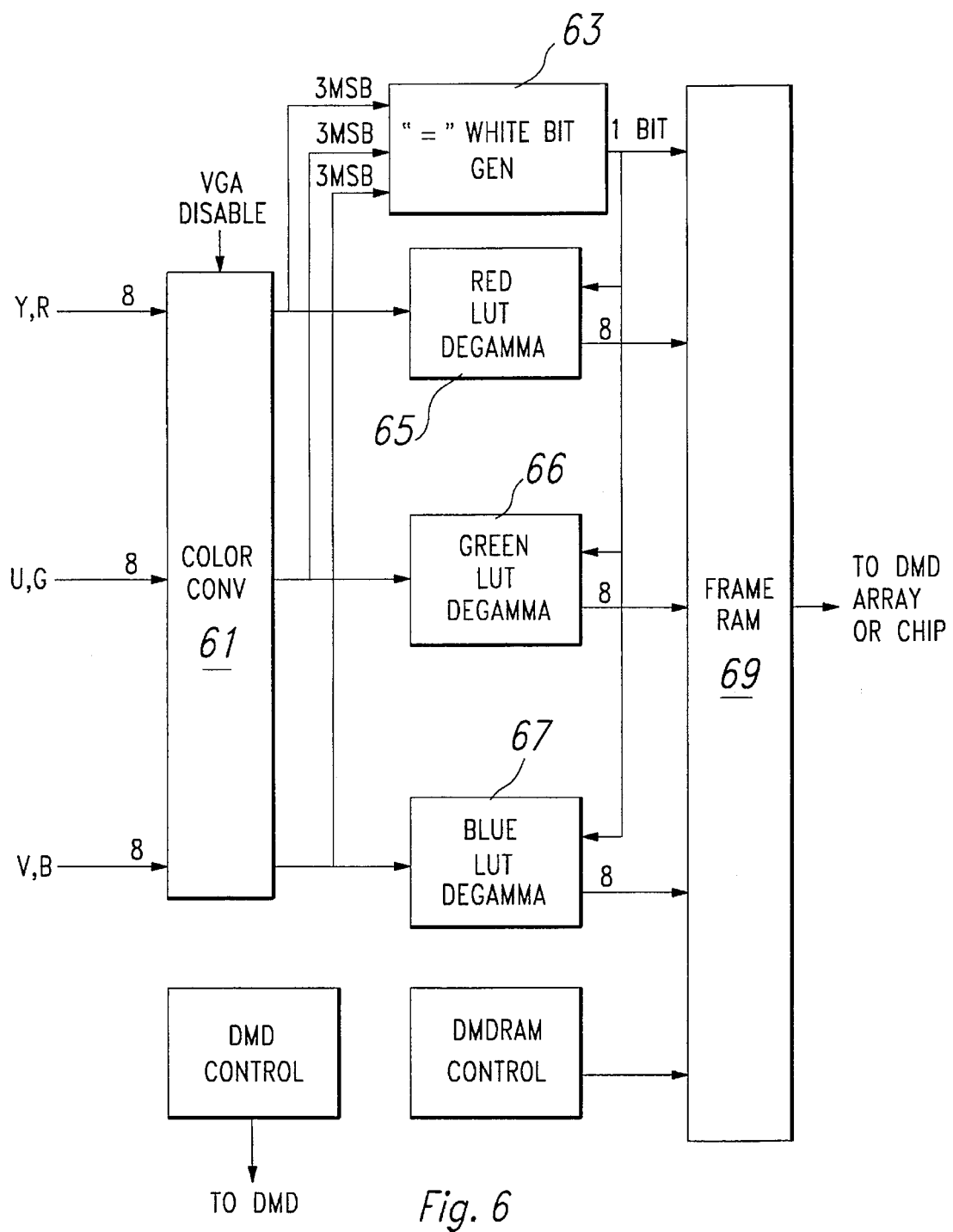
FIG. 6 is a block diagram of the system in accordance with one embodiment of the present invention.

Referring to FIG. 6 the red, green and blue outputs from the color converter 61 (Block 50 in FIG. 1) are applied to a white bit generator 63 and separately to red, green and blue degamma Lookup tables (LUT) 65, 66, and 67, respectively. In the embodiment described herein 8 bits describes the intensity levels for the red, green and blue signals. In the 8-bit system, each pixel value is divided by 32. The intensity levels can be represented by other number of bits such as 6. A frame RAM (Random Access Memory) 69 stores a complete frame of pixels where 25 bits are stored in this embodiment for each pixel. There are 8 bits for each color or 24 bits and 1 bit from generator 63. Generator 63 is coupled to the separate three color outputs from the color converter 61 and all the levels are compared and if all the levels from the video sources exceed a threshold a white bit (logic one level for example) is provided. In one preferred embodiment this may be when all three levels are also equal. The threshold is so when the three colors are combined one gets for that pixel a white color of sufficient intensity to be at boost white level. This comparing may be done by comparing the three MSB (most significant bits) or equivalent. When the white bit is generated it is also applied to the DMD control and DMDRAM control. The DMDRAM control tells the frame RAM where to get the data, which of the 25 bits, etc. The DMD control is sent to the DMD directly. The white bit is loaded into the DMD array at the start of all color transitions to cause the individual pixels to be turned on during these times. When the white bit is generated, for example a logic one level, the bit may also be applied to each of the three LUTs 65, 66, and 67 (Filter 64 in FIG. 1). The degamma LUTs are discussed in application Ser. No. 08/315,457, filed Sep. 30, 1994, by Doherty et al. and entitled "Error Diffusion Filter for DMD Display", incorporated herein by reference. When the generated white bit is applied to the LUTs 65, 66, and 67 the tables call up a higher transfer function so a higher intensity level is provided out of each LUT to provide a smooth ramping function for the higher light level.

What is claimed is:

1. A method for accentuating intense white display areas in a sequential DMD video system comprising the steps of:

generating a special signal that indicates a boost white intensity; and during the presence of said special signal, enabling a DMD mirror to be in the on position during times when a source of light for the DMD mirror traverses a color boundary of a color wheel.

2. A method for accentuating intense white display areas in a sequential DMD video system comprising the steps of:

generating a special signal for each pixel that indicates a boost white intensity of said pixel in all colors; and during the presence of said special signal, enabling DMD mirrors of said DMD system to be turned on during the times a source of light traverses a color boundary of a color wheel such that said DMD mirrors receive different mixes of color light that are integrated together to produce the intense white.

3. The method of claim 2 including after the generating step the step of loading said special signals into a DMD array at the start of all color transition periods.

4. The method of claim 2 wherein said special signal is generated by first comparing red, green, and blue digital signals and generating the boost signal when the pixel from the red, green, and blue are all over a given threshold.

5. The method of claim 4 including the step of augmenting the original transfer function within the degamma lookup tables for the red, green, and blue colors in response to the generated special signal.

6. The method of claim 5 wherein the special signal is used to alter the gain in the degamma lookup tables to provide a smooth ramping function.

7. A system for accentuating intense white display areas in sequential DMD video system including a plurality of mirrors illuminated from a light source through a color wheel comprising:

a generator coupled to incoming color video signals for generating a special signal representing intensity above a given threshold; and a mirror controller coupled to mirrors of said DMD video system and responsive to said special signal for enabling said mirrors to be turned on during traverses of color boundaries of said color wheel.

8. The system of claim 7, wherein said color video signals are red, green and blue video signals.

9. The system of claim 7 including separate degamma lookup tables coupled to each incoming color video signals for providing a first transfer function and said degramma lookup tables in response to said special signal augmenting said transfer function.

10. A system for accentuating intense white displays in split reset DMD video system including a plurality of DMD mirrors illuminated from a light source through a color wheel and wherein at color wheel boundaries stepped groups of pixels are sequentially turned off and in like order said stepped groups of pixels are sequentially turned on comprising, in combination:

a source of at least three color video signals;

a generator coupled to said color video signals for generating a special signal representing an intensity of all of said video signals above a given threshold; and a mirror controller coupled to said DMD mirrors and responsive to said special signal for enabling said DMD mirrors to remain turned on during said color wheel boundaries.

11. The system of claim 10 including degamma lookup tables with one degamma table for each color, said lookup tables coupled to said generator and responsive to the generating of said special signal for boosting the transfer function of said tables.

12. A system for accentuating intense white displays in split reset DMD video system including a plurality of DMD mirrors illuminated from a light source through a color wheel and wherein at an absolute color wheel boundary time period all of said pixels are turned off and at first transition time period before said absolute color wheel boundary said pixels are sequentially turned off in groups before said absolute color boundary and at a second transition time period following said absolute color boundary in like order said stepped groups of pixels are sequentially turned on comprising, in combination:

a source of at least three color video signals;

a generator coupled to said color video signals for generating a special signal representing an intensity above a given threshold; and a mirror controller coupled to said DMD mirrors and responsive to said special signal for enabling said DMD mirrors to be turned on during said absolute color boundaries and during said first and second transition time periods.

13. The system of claim 12 including degamma lookup tables with one for each color said lookup tables coupled to said generator and responsive to the generation of said special signal for boosting the transfer function of said tables.

14. A method for accentuating intense white displays in split reset DMD video system including a plurality of DMD mirrors illuminated from a light source through a color wheel and wherein at an absolute color wheel boundary time period all of said pixels are turned off and at first transition time period before said absolute color wheel boundary said pixels are sequentially turned off in groups before said absolute color boundary and at a second transition time period following said absolute color boundary in the same order said stepped groups of pixels are turned on comprising the steps of:

providing a source of at least three color video signals;

generating a special signal representing an intensity above a given threshold when all of said color video signals have about equal intensity above a given threshold; and enabling said DMD mirrors to be turned on during said absolute color boundaries and during said first and second transition time periods in response to said special signal.

15. The method of claim 14 including the steps of: providing degamma lookup tables for each color; coupling said special signal to said tables, and augmenting the transfer function of said tables to produce a boost response in response to said special signal.

16. A method for accentuating intense white displays in split reset DMD video system including a plurality of DMD mirrors illuminated from a light source through a color wheel and wherein at color wheel boundaries stepped groups of pixels are sequentially turned off and in like order said stepped groups of pixels are turned on comprising the steps of:

providing a source of at least three color video signals;

generating a special signal representing an intensity of all of said video signals above a given threshold; and enabling said DMD mirrors to remain turned on during said color wheel boundaries when said special signal is generated.

17. The method of claim 16 including the steps of: providing degamma lookup tables for each color; coupling said special signal to said tables and increasing the gain from said tables in response to said special signal.

* * * * *